(12) United States Patent
Fukui et al.

(10) Patent No.: US 12,058,557 B2
(45) Date of Patent: Aug. 6, 2024

(54) COMMUNICATION SYSTEM, COMMUNICATION DEVICE, AND TERMINAL DEVICE

(71) Applicant: NIPPON TELEGRAPH AND TELEPHONE CORPORATION, Tokyo (JP)

(72) Inventors: Tatsuya Fukui, Musashino (JP); Naotaka Shibata, Musashino (JP); Keita Takahashi, Musashino (JP); Hideaki Kimura, Musashino (JP); Noriyuki Ota, Musashino (JP); Hirofumi Yamamoto, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 347 days.

(21) Appl. No.: 17/603,464

(22) PCT Filed: Apr. 2, 2020

(86) PCT No.: PCT/JP2020/015132
§ 371 (c)(1),
(2) Date: Oct. 13, 2021

(87) PCT Pub. No.: WO2020/213407
PCT Pub. Date: Oct. 22, 2020

(65) Prior Publication Data
US 2022/0201536 A1 Jun. 23, 2022

(30) Foreign Application Priority Data
Apr. 16, 2019 (JP) ................. 2019-077551

(51) Int. Cl.
*H04W 28/02* (2009.01)
*H04W 92/04* (2009.01)

(52) U.S. Cl.
CPC ........ *H04W 28/0252* (2013.01); *H04W 92/04* (2013.01)

(58) Field of Classification Search
CPC . H04W 28/0252; H04W 76/12; H04W 92/04; H04L 69/14; H04M 3/00
See application file for complete search history.

(56) References Cited

U.S. PATENT DOCUMENTS

| 2018/0279176 A1* | 9/2018 | Legg | H04W 28/10 |
| 2018/0352477 A1* | 12/2018 | Singh | H04W 76/15 |

(Continued)

OTHER PUBLICATIONS

3rd Generation Partnership Project; Technical Specification Group Services and System Aspects; Study on the Wireless and Wireline Convergence for the 5G system architecture (Release 16), 3GPP TR 23.716 V16.0.0 Technical Report, Dec. 2018.

*Primary Examiner* — Chi Ho A Lee
(74) *Attorney, Agent, or Firm* — Harness, Dickey & Pierce, P.L.C.

(57) ABSTRACT

An object is to provide a communication system, a communication apparatus, and a terminal apparatus capable of integrating communication paths of both of mobile access and fixed access while addition of a new function to a mobile network is reduced.

In a communication system 100 according to the present invention, a communication path of one mobile bearer between a base station master station apparatus 300 and a user gateway 600 includes a split bearer configuration including a mobile access communication path being connected from the base station master station apparatus 300 to the user gateway 600 via a mobile access slave station apparatus 400 and a non-mobile access communication path (Continued)

being connected from the base station master station apparatus 300 to the user gateway 600 via a non-mobile access slave station apparatus 500.

4 Claims, 10 Drawing Sheets

(56) References Cited

U.S. PATENT DOCUMENTS

| | | | |
|---|---|---|---|
| 2019/0132897 A1* | 5/2019 | Pradas | H04W 28/082 |
| 2019/0223002 A1* | 7/2019 | Novlan | H04W 72/20 |
| 2020/0028409 A1* | 1/2020 | Jastrzebski | H02K 21/46 |
| 2020/0068632 A1* | 2/2020 | Kato | H04W 40/22 |
| 2020/0396784 A1* | 12/2020 | Toeda | H04W 36/0069 |
| 2021/0153262 A1* | 5/2021 | Mochizuki | H04W 56/0015 |
| 2022/0086710 A1* | 3/2022 | Xu | H04W 48/16 |
| 2022/0174514 A1* | 6/2022 | Kahn | H04W 48/18 |

* cited by examiner

| FIXED ACCESS ID | BROADCAST PSEUDO CELL INFORMATION | | | |
|---|---|---|---|---|
| | PLMN | CellID | CQI | ... |
| #0000001 | 44010 | 100 | 14 | ... |
| #0000001 | 44020 | 500 | 11 | ... |
| #0000002 | 44010 | 100 | 14 | ... |
| #0000003 | 44020 | 500 | 11 | ... |
| #0000004 | 44050 | 600 | 10 | ... |
| ... | ... | ... | ... | ... |

Fig. 4

| TERMINAL ID | MOBILE FRONT HAUL PACKET INFORMATION | | | FIXED ACCESS PACKET INFORMATION | | |
|---|---|---|---|---|---|---|
| | BASE STATION MASTER STATION APPARATUS IP ADDRESS | FIXED ACCESS SLAVE STATION APPARATUS IP ADDRESS | TUNNEL ID | FIXED ACCESS SLAVE STATION APPARATUS IP ADDRESS | MOBILE FIXED USER GATEWAY IP ADDRESS | TRANSFER PROTOCOL |
| 0x1234··· | 10.0.0.1 | 10.0.0.2 | 0xABCDE··· | FA00:0100::1 | FA00:0100::3 | IPv6 |
| 0x1235··· | 10.0.0.1 | 10.0.0.2 | 0x25A31··· | FA00:0100::1 | FA00:0100::5 | IPv6 |
| 0x1236··· | 172.16.0.1 | 172.16.0.10 | 0x218A9··· | FA00:0100::1 | FA00:0300::10 | IPv6 |
| 0x1237··· | 172.18.0.1 | 172.17.0.200 | 0xAA523··· | FA00:0100::1 | FA00:0500::BB | IPsec SA=100 |
| ... | ... | ... | ... | ... | ... | ... |

Fig. 5

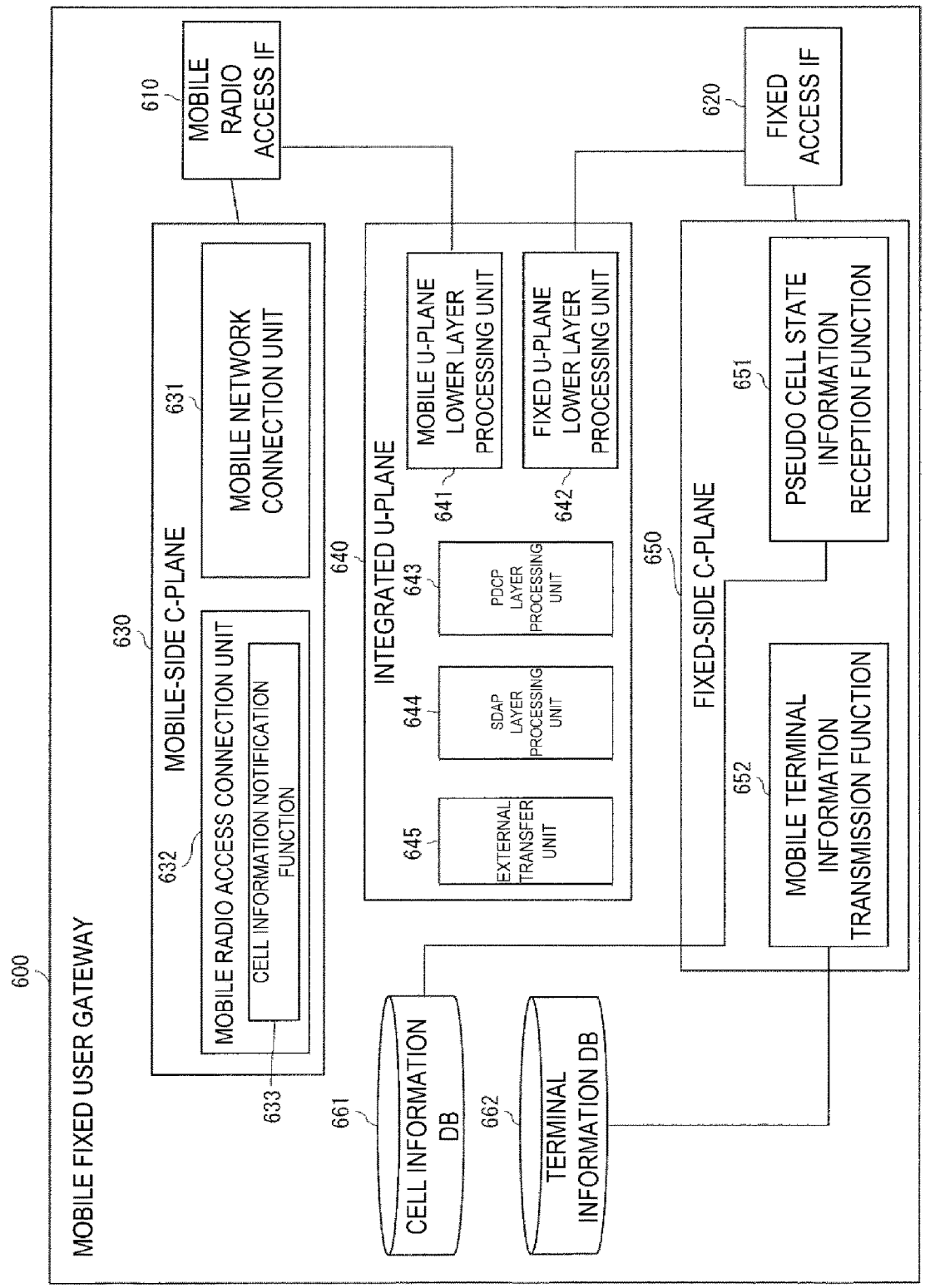

| CELL ID | CELL DETAILED INFORMATION | BROADCAST SOURCE INFORMATION |
|---|---|---|
| 10 | CQI=8、 ⋯ | MOBILE ACCESS |
| 20 | CQI=9、 ⋯ | MOBILE ACCESS |
| 100 | CQI=14、 ⋯ | FIXED ACCESS |
| ⋯ | ⋯ | |

Fig. 7

| ITEM | VALUE |
|---|---|
| TERMINAL ID | 0x1234⋯ |
| FIXED ACCESS IP ADDRESS | FA00:0100::3 |
| FIXED ACCESS TRANSFER PROTOCOL | IPv6 |

Fig. 8

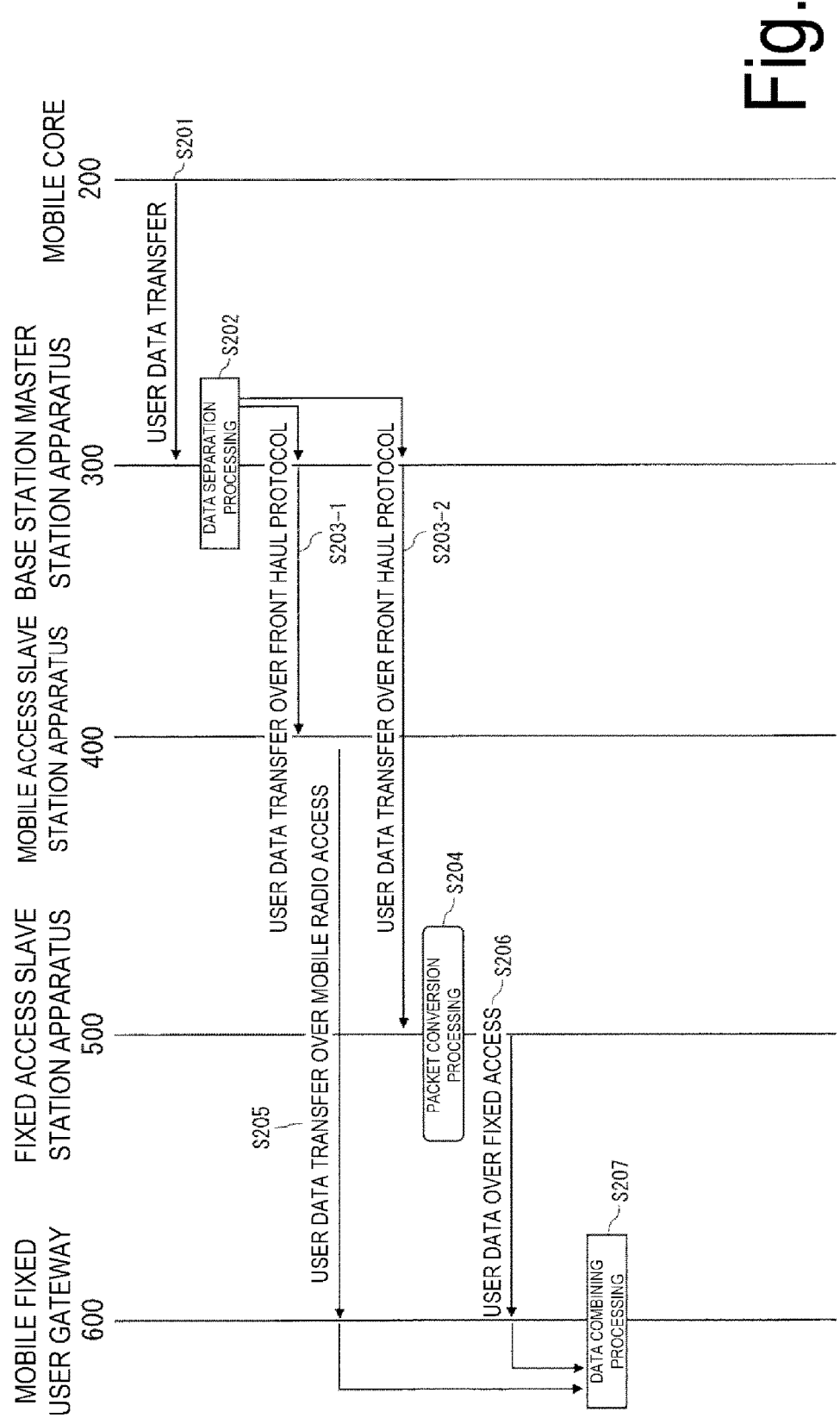

COMMUNICATION SYSTEM, COMMUNICATION DEVICE, AND TERMINAL DEVICE

CROSS-REFERENCE TO RELATED APPLICATIONS

This application is a 371 U.S. National Phase of International Application No. PCT/JP2020/015132 filed on Apr. 2, 2020, which claims priority to Japanese Application No. 2019-077551 filed on Apr. 16, 2019. The entire disclosures of the above applications are incorporated herein by reference.

BACKGROUND ART

In recent years, innovations of technology of mobile communication using radio are remarkable, and it is expected that maximum throughput of approximately 1 Gbps can be implemented in Long Term Evolution (LTE), and maximum throughput of as high as 20 Gbps can implemented in 5G.

However, in mobile communication, it is considered to be difficult to efficiently support all of communication use cases due to reasons such as shared use of limited frequency resources with a plurality of users, susceptibility to disturbance or the like, and presence of a dead zone in an indoor place or the like where radio waves are difficult to enter. Accordingly, it is expected that there will continue to be a need for fixed communication using wired access such as optical fibers, wireless Local Area Network (LAN) access such as Wi-Fi, or the like.

At the same time, means for merging and properly using the mobile communication and the fixed communication as described above has been put under discussion, but none of such has been in widespread use so far. For example, in NPL 1, architecture as in FIG. 1 is introduced.

CITATION LIST

Non Patent Literature

NPL 1: 3GPP TR 23.716 Study on the Wireless and Wireline Convergence for the 5G system architecture

SUMMARY OF THE INVENTION

Technical Problem

In the architecture of NPL 1, a fixed access accommodation base station apparatus is newly defined, and the fixed access accommodation base station apparatus is connected to a mobile core. In this manner, a mobile fixed user gateway can properly use the mobile communication and the fixed communication. However, the case of the architecture of NPL 1 requires mutual connection between the fixed access accommodation base station apparatus and the mobile core, hence requiring addition of a function to the mobile core.

The mobile core includes a large number of functions, such as authentication, session management, position management, and handover, and thus if a function is intended to be added, a process of making adjustments with such conventional functions tends to be increased. The mobile core is connected to all of the base stations, and thus it is difficult to implement such a small start as "providing a new function for only a necessary part". Thus, there is a problem that it is extremely difficult to add a function to the mobile core.

In addition, in the architecture of NPL 1, a radio bearer via the mobile access base station and a radio bearer of the fixed access accommodation base station apparatus are separated. Thus, there is also a problem that a new function of integrating the two radio bearers is further required when the mobile communication and the fixed communication are used by integrating both of communications.

In the light of this, in order to solve the problems described solve, the present invention has an object to provide a communication system, a communication apparatus, and a terminal apparatus capable of integrating communication paths of both of mobile access and fixed access while addition of a new function to a mobile network is reduced.

Means for Solving the Problem

In order to achieve the object described above, a communication system according to the present invention implements a split bearer of splitting one mobile bearer into a communication path of mobile access and a communication path of non-mobile access by performing protocol conversion in the communication path of the non-mobile access.

Specifically, a communication system according to the present invention is a communication system including: a base station master station apparatus; one or a plurality of mobile access slave station apparatuses; one or a plurality of non-mobile access slave station apparatuses; and a user gateway, wherein the base station master station apparatus and one of the one or the plurality of mobile access slave station apparatuses and the base station master station apparatus and one of the one or the plurality of non-mobile access slave station apparatuses are connected with an identical front haul logic interface, one of the one or the plurality of mobile access slave station apparatuses and the user gateway are connected with any mobile radio access, one of the one or the plurality of non-mobile access slave station apparatuses and the user gateway are connected with any non-mobile access, and a communication path of one mobile bearer between the base station master station apparatus and the user gateway includes a split bearer configuration including a mobile access communication path being connected from the base station master station apparatus to the user gateway via one of the one or the plurality of mobile access slave station apparatuses and a non-mobile access communication path being connected from the base station master station apparatus to the user gateway via one of the one or the plurality of non-mobile access slave station apparatuses.

A communication apparatus according to the present invention is a communication apparatus of a communication system, the communication apparatus being a non-mobile access slave station apparatus, the communication system including a communication path of one mobile bearer between a base station master station apparatus included in the communication system and a user gateway included in the communication system includes a split bearer configuration including a mobile access communication path being connected from the base station master station apparatus to the user gateway via a mobile access slave station apparatus included in the communication system and a non-mobile access communication path being connected from the base station master station apparatus to the user gateway via the non-mobile access slave station apparatus, the communication apparatus including: a communication path formation unit configured to form the non-mobile access communication path by connecting to the base station master station apparatus by using a front haul logic interface identical to a front haul logic interface of the mobile access slave station apparatus to be connected to the base station master station apparatus and connecting to the user gateway with any non-mobile access; and a conversion unit configured to perform conversion of a packet format between the non-mobile access and the front haul logic interface.

The communication path formation unit includes: a non-mobile access connection function including an access state information control function of generating pseudo cell information and transmitting the pseudo cell information to the user gateway, and a conversion information registration function of receiving mobile terminal information from the user gateway and recording the mobile terminal information and non-mobile access terminal information in a conversion information database in association with each other; and a mobile front haul connection function including a conversion information update function of registering the mobile terminal information received from the base station master station apparatus with a mobile fixed conversion information database when slave station addition processing for a mobile terminal is executed in response to a request from the base station master station apparatus, and the conversion unit includes a packet conversion function of converting a header of a user data packet transferred from the front haul logic interface for the user data packet, based on a record of the mobile fixed conversion information database.

Further, a terminal apparatus according to the present invention is a user gateway. In the communication system, a base station master station apparatus of the communication system and a mobile access slave station apparatus of the communication system, and the base station master station apparatus and a non-mobile access slave station apparatus of the communication system being connected with an identical front haul logic interface, the terminal apparatus comprising: a mobile access interface to be connected to the mobile access slave station apparatus with mobile access; a non-mobile access interface to be connected to the non-mobile access slave station apparatus with non-mobile access; a mobile terminal information transmission function of transmitting mobile terminal information to the non-mobile access slave station; and a pseudo cell state information reception function of receiving pseudo cell information transmitted from the non-mobile access and registering the pseudo cell information with a cell information database, wherein a communication path of one mobile bearer with the base station master station apparatus configures a split bearer including a mobile access communication path being connected from the base station master station apparatus via the mobile access slave station apparatus and a non-mobile access communication path being connected from the base station master station apparatus via the non-mobile access slave station apparatus.

According to the present invention, by adopting the split bearer configuration, the communication paths of both of the mobile access and the fixed access can be integrated while addition of a new function to the mobile network is reduced.

Note that each of the inventions described above can be combined with each other to the extent possible.

Effects of the Invention

According to the present invention, the communication paths of both of the mobile access and the fixed access can be integrated while addition of a new function to the mobile network is reduced to an insignificant amount.

BRIEF DESCRIPTION OF DRAWINGS

FIG. 4 is a diagram illustrating a pseudo cell information database included in the non-mobile access slave station apparatus according to the present invention.

FIG. 5 is a diagram illustrating a mobile fixed conversion information database included in the non-mobile access slave station apparatus according to the present invention.

FIG. 6 is a diagram illustrating a user gateway according to the present invention.

FIG. 7 is a diagram illustrating a cell information database included in the user gateway according to the present invention.

FIG. 8 is a diagram illustrating a terminal information database included in the user gateway according to the present invention.

FIG. 10 is a diagram illustrating a procedure of user data transfer in the communication system according to the present invention.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 1:
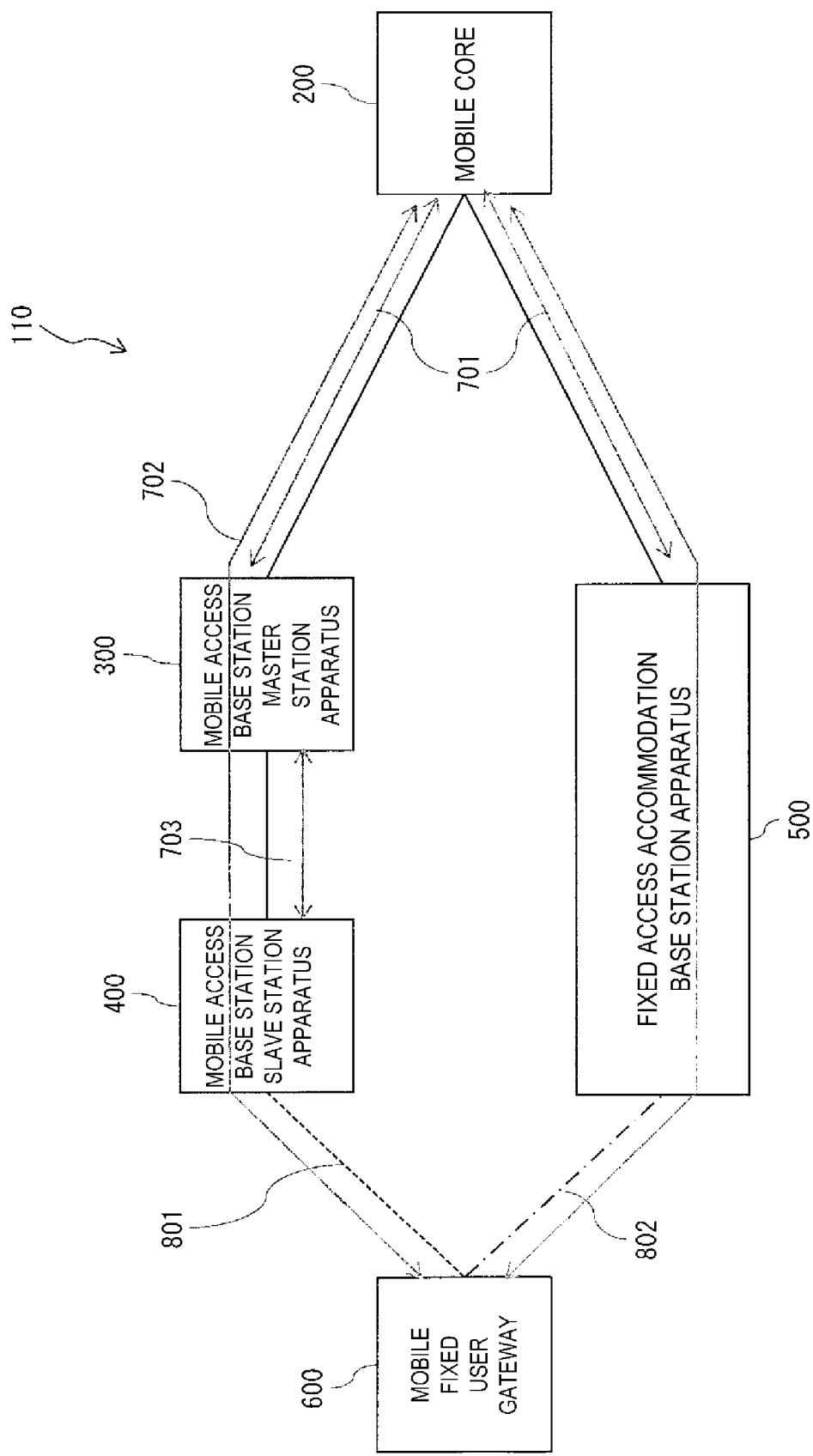
FIG. 1 is a diagram illustrating a communication system of merging and properly using mobile communication and fixed communication.
Figure 2:
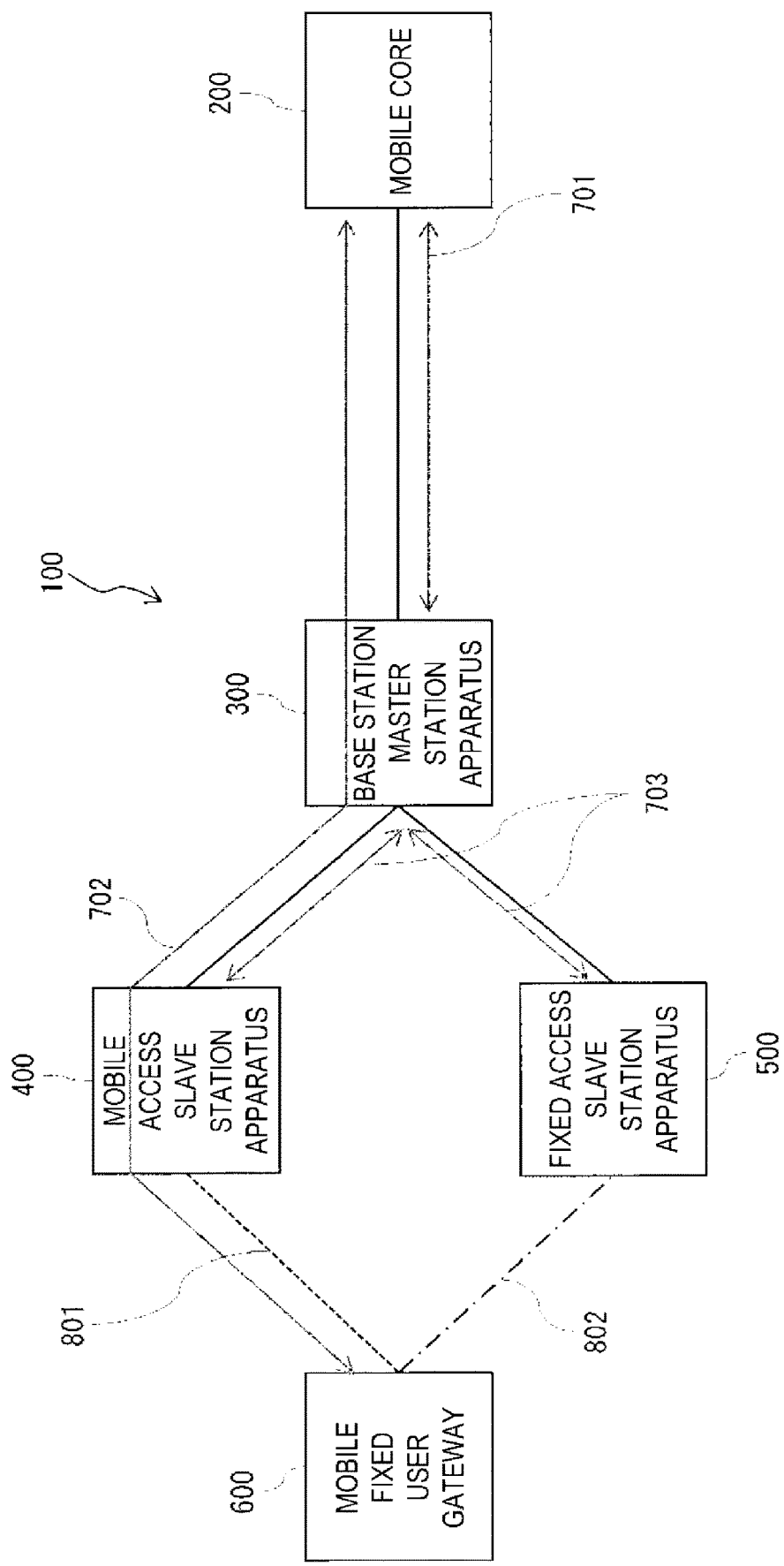
FIG. 2 is a diagram illustrating a communication system according to the present invention.

FIG. 2 is a configuration diagram illustrating communication architecture 100 of the present embodiment. The communication architecture 100 is a communication system including a mobile core 200, a base station master station apparatus 300, one or a plurality of mobile access slave station apparatuses 400, one or a plurality of non-mobile access slave station apparatuses 500, and a user gateway 600. Note that, in the following description, non-mobile access may be referred to as "fixed access".

The base station master station apparatus 300 and the mobile access slave station apparatus 400, and the base station master station apparatus 300 and the non-mobile access slave station apparatus 500 are connected with an identical front haul logic interface 703, the mobile access slave station apparatus 400 and the user gateway 600 are connected with any mobile radio access 801, and the non-mobile access slave station apparatus 500 and the user gateway 600 are connected with any non-mobile access 802.

The communication architecture 100 includes a split bearer configuration, in which a communication path of one mobile bearer between the base station master station apparatus 300 and the user gateway 600 includes a mobile access communication path that is connected from the base station master station apparatus 300 to the user gateway 600 via the mobile access slave station apparatus 400 and a non-mobile access communication path that is connected from the base station master station apparatus 300 to the user gateway 600 via the non-mobile access slave station apparatus 500.

The connection of each solid line in FIG. 2 denotes logical connection between elements, and does not denote physical connection. Specifically, the connection may be implemented through the use of a general communication apparatus, such as a media converter, an L2 switch, and a router. The connection of a broken line in FIG. 2 denotes that connection between elements is connection including a specific physical medium. The connection of each arrow in FIG. 2 denotes a connection relationship of higher layer logic interfaces between the elements.

The mobile core 200 is an aggregation of parts that perform authentication, session management, position management, and control of handover and the like in a mobile network. In general, when the mobile network employs Long Term Evolution (LTE), the mobile core 200 is an aggregation of an Evoluved Packet Core (EPC), a Home Subscriber Server (HSS), and the like, and when the mobile network employs 5G, the mobile core 200 is an aggregation of a U-Plane Function (UPF), an Access and Mobility management Function (AMF), a Session Management Function (SMF), and the like.

The base station master station apparatus 300 is an aggregation node side of the base station apparatus in a Centralized Radio Access Network (C-RAN) configuration, and generally includes a function that is equivalent to what is referred to as a Base Band Unit (BBU) and a Central Unit (CU).

The mobile access slave station apparatus 400 is a distribution node side of the base station apparatus in the C-RAN configuration, and generally includes a function that is equivalent to what is referred to as a Remote Radio Head (RRH) and a Distributed Unit (DU).

The fixed access slave station apparatus 500 and the mobile fixed user gateway 600 will be described later with reference to FIGS. 3 and 6.

In the communication architecture 100, the mobile core 200 and the base station master station apparatus 300, the base station master station apparatus 300 and the mobile access slave station apparatus 400, the base station master station apparatus 300 and the fixed access slave station apparatus 500, the mobile fixed user gateway 600 and the mobile access slave station apparatus 400, and the mobile fixed user gateway 600 and the fixed access slave station apparatus 500 are connected.

The mobile fixed user gateway 600 and the mobile access slave station apparatus 400 are connected via a mobile radio access configured with radio L1 and L2 protocols such as Radio Link Control (RLC), Medium Access Control (MAC), and PHYsical (PHY), with a mobile network-specific radio frequency being a medium.

The mobile fixed user gateway 600 and the fixed access slave station apparatus 500 are connected via fixed access configured with Ethernet, the IP, or the wireless LAN protocol, with a communication apparatus such as a switch and a router, a wired LAN using an optical fiber or the like, and a wireless LAN such as WiFi, being a medium.

In the communication architecture 100, a base station-mobile core interface 701 is connected as a higher layer logic interface between the mobile core 200 and the base station master station apparatus 300, a terminal-mobile core interface 702 between the mobile core 200 and the mobile fixed user gateway 600, a mobile front haul interface 703 between the base station master station apparatus 300 and the mobile access slave station apparatus 400, and a mobile front haul interface 703 between the base station master station apparatus 300 and the fixed access slave station apparatus 500.

The base station-mobile core interface 701 is a higher layer logic interface that performs authentication, session management, position management, and control of handover and the like of a mobile terminal connected to the base station apparatus and user data transfer, and includes a function that is equivalent to the Si interface in LTE, the N2/N3 interface in the 5G, and the like.

The terminal-mobile core interface 702 is a higher layer logic interface for implementing processing for the mobile terminal to be connected to the mobile network, such as Non-Access Stratum (NAS), between the mobile core and the mobile terminal.

The mobile front haul interface 703 is a higher layer logic interface that performs data transfer and control between the base station master station apparatus, the aggregation node, and each of the distribution nodes in the C-RAN configuration, and includes a function that is equivalent to the F1 interface in 5G.

Figure 3:
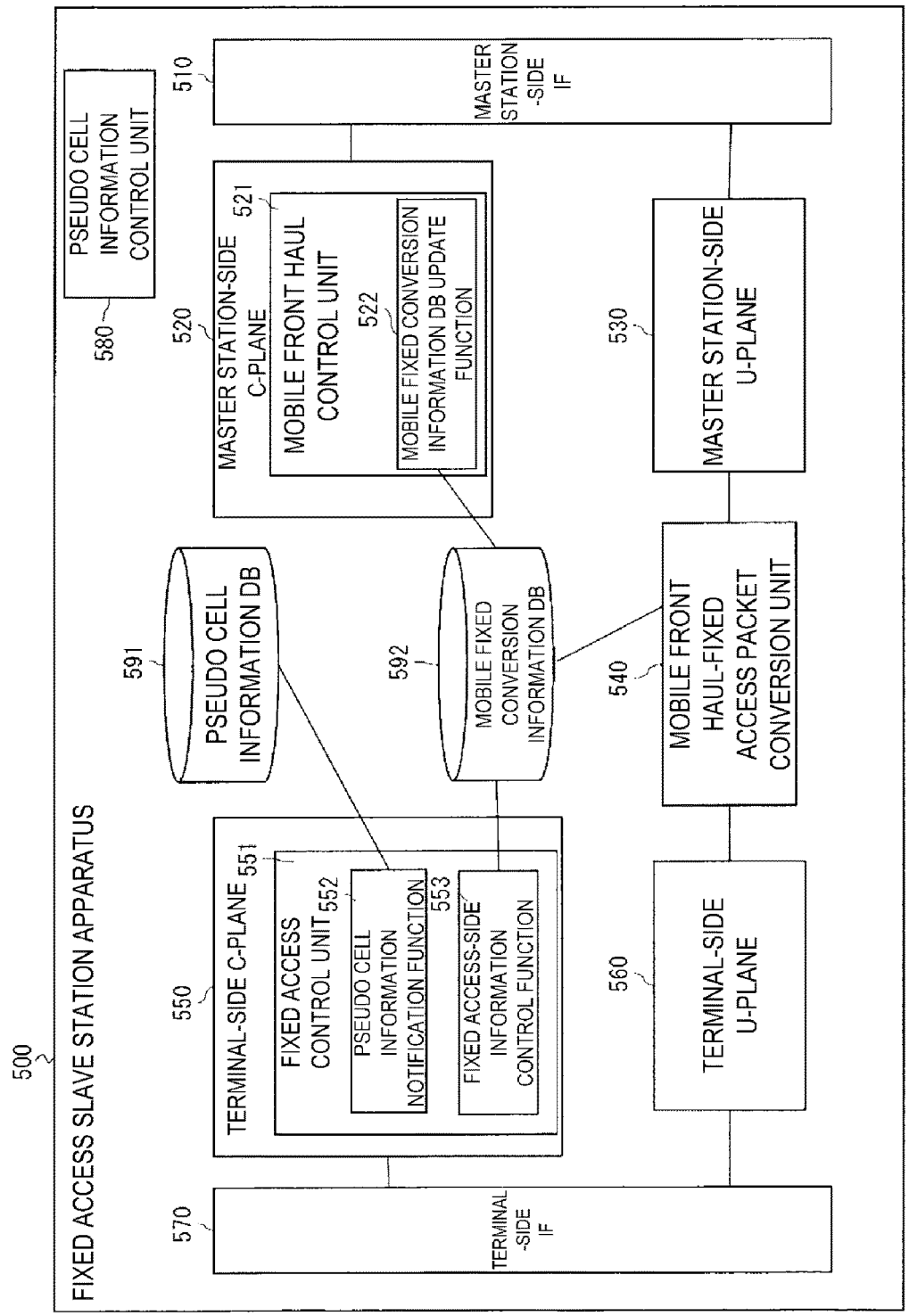
FIG. 3 is a diagram illustrating a non-mobile access slave station apparatus according to the present invention.

FIG. 3 is a configuration diagram illustrating the fixed access slave station apparatus 500 according to the present embodiment. The fixed access slave station apparatus 500 is a non-mobile access slave station apparatus, and includes a communication path formation unit and a conversion unit. The communication path formation unit forms the non-mobile access communication path by connecting to the base station master station apparatus 300 by using the front haul logic interface identical to the front haul logic interface of the mobile access slave station apparatus 400 to be connected to the base station master station apparatus 300 and connecting to the user gateway 600 with any non-mobile access.

The conversion unit performs conversion of a packet format between the non-mobile access and the front haul logic interface.

Specifically, the communication path formation unit includes a non-mobile access connection function and a mobile front haul connection function.

The non-mobile access connection function includes an access state information control function of generating pseudo cell information and transmitting the pseudo cell information to the user gateway, and a conversion information registration function of receiving mobile terminal information from the user gateway and recording the mobile terminal information and the non-mobile access terminal information in a conversion information database in association with each other.

The mobile front haul connection function includes a conversion information update function of registering the mobile terminal information received from the base station master station apparatus with a mobile fixed conversion information database when slave station addition processing for the mobile terminal is executed in response to a request from the base station master station apparatus.

The conversion unit includes a packet conversion function of converting a header of a user data packet, based on a record of the mobile fixed conversion information database, the user data packet being transferred from the front haul logic interface.

The fixed access slave station apparatus 500 includes a master station-side IF 510, a master station-side C-Plane 520, a master station-side U-Plane 530, a mobile front haul-fixed access packet conversion unit 540, a terminal-side C-Plane 550, a terminal-side U-Plane 560, a terminal-side IF 570, a pseudo cell information control unit 580, a pseudo cell information DB 591, and a mobile fixed conversion information DB 592.

The master station-side IF 510 performs logical connection with the base station master station apparatus 300.

The master station-side C-Plane 520 performs control communication on the mobile front haul interface 703 connected to the base station master station apparatus 300. The master station-side U-Plane 530 performs user data communication on the mobile front haul interface 703 connected to the base station master station apparatus 300. The mobile front haul-fixed access packet conversion unit 540 includes two functions which will be described later. The terminal-side C-Plane 550 performs control communication with the mobile fixed user gateway 600 via fixed access. The terminal-side U-Plane 560 performs user data communication with the mobile fixed user gateway 600 via fixed access. The terminal-side IF 570 logically connects with the mobile fixed user gateway 600 via fixed access. The pseudo cell information control unit 580 controls, from the outside, pseudo cell information to be notified to the mobile fixed user gateway 600. In the pseudo cell information DB 591, the pseudo cell information to be notified to the mobile fixed user gateway is recorded. In the mobile fixed conversion information DB 592, packet conversion operation of the mobile front haul-fixed access packet conversion unit 540 is described.

The terminal-side IF 570 logically connects with the mobile fixed user gateway 600.

The two functions of the mobile front haul-fixed access packet conversion unit 540 are as follows:
(1) a function of converting a user data packet that is received from the base station master station apparatus 300 via the mobile front haul interface 703 into a packet format appropriate for fixed access, based on description of the mobile fixed conversion information DB 592 and transferring the converted user data packet to the terminal-side U-Plane 560, and
(2) a function of converting a user data packet that is received from the mobile fixed user gateway via fixed access into a packet format appropriate for the mobile front haul and transferring the converted user data packet to the terminal-side U-Plane 530.

The master station-side C-Plane 520 includes a mobile front haul control unit 521 that includes a mobile fixed conversion information DB update function 522 of additionally writing the mobile terminal information obtained via the mobile front haul interface 703 into the mobile fixed conversion information DB 592, in addition to the capability of executing the control operation executed in the mobile front haul interface 703.

The terminal-side C-Plane 550 includes a fixed access control unit 551 that includes a pseudo cell information notification function 552 of notifying the mobile fixed user gateway 600 of the information recorded in the pseudo cell information DB 591 and a fixed access-side information control function 553 of additionally writing the information on the fixed access side of the mobile fixed user gateway 600 to the mobile fixed conversion information DB 592, in addition to the capability of executing the control operation such as authentication, encapsulation, and address delivery in fixed access.

Note that the non-mobile access connection function corresponds to the terminal-side C-Plane 550, the terminal-side U-Plane 560, and the terminal-side IF 570. The mobile front haul connection function corresponds to the master station-side C-Plane 520, the master station-side U-Plane 530, and the master station-side IF 510. The conversion unit corresponds to the mobile fixed conversion information DB 592 and the mobile front haul-fixed access packet conversion unit 540.

FIG. 4 illustrates the pseudo cell information DB 591 according to the present embodiment. The pseudo cell information DB 591 includes a fixed access ID for identifying each fixed access when a plurality of fixed accesses are accommodated in the fixed access slave station apparatus 500, and broadcast pseudo cell information to be notified to the mobile fixed user gateway 600 using the fixed access. Here, as the fixed access ID, a logical ID such as a VLAN number may be used, or an original ID assigned to each physical medium may be used.

FIG. 5 illustrates the mobile fixed conversion information DB 592 according to the present embodiment. The mobile fixed conversion information DB 592 includes a terminal ID indicating terminal identification information on a mobile network of the mobile fixed user gateway, mobile front haul packet information indicating contents of the packet on the mobile front haul of the terminal ID, and fixed access packet information indicating contents of the packet on the fixed access. Here, as the terminal ID, a terminal-specific ID such as International Mobile Subscriber Identity (IMSI) information is assumed.

FIG. 6 is a configuration diagram illustrating the mobile fixed user gateway 600 according to the present embodiment. The mobile fixed user gateway 600 includes a mobile access radio interface 610, a non-mobile access interface 620, a mobile terminal information transmission function 652, and a pseudo cell state information reception function 651. The mobile access radio interface 610 is connected to the mobile access slave station apparatus 400 with mobile access. The non-mobile access interface 620 is connected to the non-mobile access slave station apparatus 500 with non-mobile access. The mobile terminal information transmission function 652 transmits the mobile terminal information to the non-mobile access slave station 500. The pseudo cell state information reception function 651 receives the pseudo cell information that is transmitted from the non-mobile access and registers the received pseudo cell information with the cell information database.

The mobile fixed user gateway 600 configures a split bearer, in which a communication path of one mobile bearer with the base station master station apparatus 300 includes a mobile access communication path that is connected from the base station master station apparatus 300 via the mobile access slave station apparatus 400 and a non-mobile access communication path that is connected from the base station master station apparatus 300 via the non-mobile access slave station apparatus 500.

More specifically, the mobile fixed user gateway 600 includes a mobile radio access IF 610, a fixed access IF 620, a mobile-side C-Plane 630, an integrated U-Plane 640, a fixed-side C-Plane 650, a cell information DB 661, and a terminal information DB 662. The mobile radio access IF 610 logically connects with the mobile access slave station apparatus 400 via mobile radio access. The fixed access IF 620 logically connects with the fixed access slave station apparatus 500 via fixed access. The mobile-side C-Plane 630 includes a mobile network connection unit 631 that performs mobile network connection processing with the mobile core 200 via the terminal-mobile core interface 702 and a mobile radio access connection unit 632 that performs control of a Radio Resource Control (RRC) function with the base station master station apparatus 300. The integrated U-Plane 640 processes user data received from the mobile radio access IF 610 and the fixed access IF 620. The fixed-side C-Plane 650 performs control communication with the fixed access slave station apparatus 500 via fixed access. The cell information DB 661 records cell information of mobile radio access and pseudo cell information of fixed access connected by the mobile fixed user gateway. The terminal information DB 662 indicates terminal information of a mobile network of the mobile fixed user gateway.

The mobile radio access connection unit 632 includes a cell information notification function 633 of notifying the base station master station apparatus 300 of both of the cell information of mobile radio access and the pseudo cell information of fixed access that are connected by the mobile fixed user gateway and recorded in the cell information DB 661, in addition to the normal RRC function.

The integrated U-plane 640 includes a mobile U-Plane lower layer processing unit 641, a fixed U-Plane lower layer processing unit 642, a PDCP layer processing unit 643, an SDAP layer processing unit 644, and an external transfer unit 645. The mobile U-Plane lower layer processing unit 641 transmits and receives data to and from the mobile radio access IF 610. The fixed U-Plane lower layer processing unit 642 transmits and receives data to and from the fixed access IF 620. The PDCP layer processing unit 643 implements a function of transmitting and receiving a PDCP packet to and from both of the mobile U-Plane lower layer processing unit 641 and the fixed U-Plane lower layer processing unit 642, and a function usually included in the PDCP layer, such as order arrangement, load balancing, and combining and separating in input and output processing with a plurality of radio bearers. The SDAP layer processing unit 644 transmits and receives the SDAP packet to and from the PDCP layer processing unit 643 to implement the function included in the SDAP layer. The external transfer unit 645 transmits and receives packets to and from an application and an external terminal apparatus that is connected to the mobile fixed user gateway 600.

The fixed-side C-Plane 650 includes a pseudo cell state information reception function 651 of receiving the pseudo cell information received from the fixed access slave station apparatus 500 and registering the received pseudo cell information with the cell information DB 661, and a mobile terminal information transmission function 652 of reading the terminal information from the terminal information DB 662 and transmitting the read terminal information to the fixed access slave station apparatus 500.

FIG. 7 illustrates the cell information DB 661 according to the present embodiment. The cell information DB 661 includes a cell ID of the cell information received by the mobile fixed user gateway, detailed cell information, and broadcast source information describing an access type of access through which the cell information is received.

FIG. 8 illustrates the terminal information DB 662 according to the present embodiment. The terminal information DB 662 includes a terminal ID indicating the terminal identification information on the mobile network included in the mobile fixed user gateway, an IP address on the fixed access network included in the mobile fixed user gateway, and a fixed access transfer protocol on the fixed access network.

Note that the fixed access slave station apparatus 500 and the mobile fixed user gateway 600 can also be implemented with computers and programs, and the programs can be either recorded in a recording medium or provided through a network.

Second Embodiment

Figure 9:
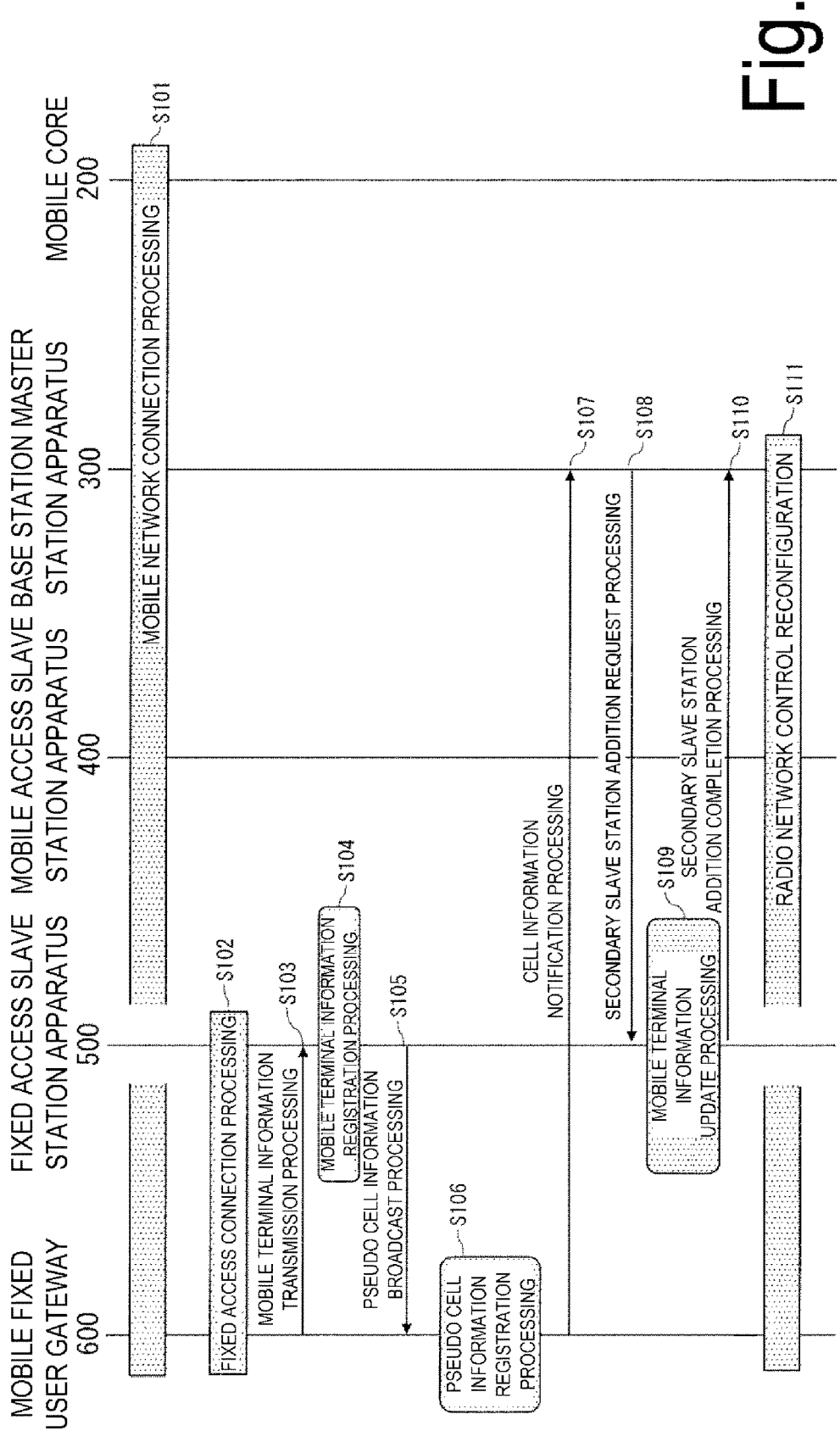
FIG. 9 is a diagram illustrating a connection sequence of a communication system according to the present invention.

FIG. 9 is a diagram illustrating a connection sequence of the mobile fixed user gateway 600 according to the present embodiment.

First, the mobile fixed user gateway 600 performs mobile network connection processing S101 via mobile access. As the mobile network connection processing S101, an attach sequence defined in 3GPP is assumed. Next, the mobile fixed user gateway 600 performs fixed access connection processing S102 for connecting with the fixed access slave station apparatus. It is assumed that the fixed access connection processing S102 is configured with a combination of authentication processing such as 802.1X and IP address assignment processing such as DHCP. Next, the mobile fixed user gateway 600 performs mobile terminal information transmission processing S103 of reading the terminal information from the terminal information DB 662 and transmitting the read terminal information to the fixed access slave station apparatus 500.

The fixed access slave station apparatus 500 that has received the terminal information performs mobile terminal information registration processing S104 of recording the received terminal ID and the fixed access packet information in the mobile fixed conversion information DB 592 in association with each other. The fixed access packet information is a combination of a fixed access IP address, a fixed access transfer protocol, and its own IP address information. The fixed access slave station apparatus 500 performs pseudo cell information broadcast processing S105 of reading the pseudo cell information DB 591 and broadcasting the pseudo cell information to the mobile fixed user gateway 600.

The mobile fixed user gateway 600 that has received the pseudo cell information performs pseudo cell information registration processing S106 of registering the received pseudo cell information with the cell information DB 661. The mobile fixed user gateway 600 performs cell information notification processing S107 of notifying the base station master station apparatus 300 of the cell information recorded in the cell information DB 661. As the cell information notification processing S107, Measurement Report defined in 3GPP is assumed.

Next, the base station master station apparatus 300 performs secondary slave station addition request processing S108 of transmitting, to the fixed access slave station apparatus 500, secondary slave station addition request of adding the fixed access slave station apparatus 400 as a slave station to be connected to the mobile fixed user gateway 600, based on the received cell information of the mobile fixed user gateway 600. As the secondary slave station addition request processing S108, Secondary Node Addition Request defined in 3GPP is assumed.

The fixed access slave station apparatus 500 that has received the secondary slave station addition request performs mobile terminal information update processing S109 of updating the mobile fixed conversion information DB 592, based on a terminal ID, a base station master station apparatus IP address, and a tunnel ID described in the secondary slave station addition request. Subsequently, the fixed access slave station apparatus 500 performs secondary slave station addition completion processing S110 of notifying the base station master station apparatus 300 of secondary slave station addition complete. As the secondary slave station addition completion processing S110, Secondary Node Addition Request Acknowledge defined in 3GPP is assumed.

Finally, radio network control reconfiguration S111 is performed between the base station master station apparatus 300 and the mobile fixed user gateway 600. As the radio network control reconfiguration S111, RRC Connection Reconfiguration defined in 3GPP is assumed.

FIG. 10 illustrates a procedure of user data transfer according to the present embodiment. When user data is transferred from the mobile core 200 to the base station master station apparatus 300 (S201), the base station master station apparatus 300 performs processing of SDAP, PDCP, and the like, and separates, in a manner similar to a transfer method of Dual Connectivitity defined in 3GPP, the user data into a communication path via the mobile access slave station apparatus 400 and a communication path via the fixed access slave station apparatus 500 (S202). The separated pieces of the user data are transferred to the slave station apparatuses (400, 500) on the front haul protocol, respectively (S203-1, S203-2). The piece of the user data transferred to the mobile access slave station apparatus 400 is transferred to the mobile fixed user gateway 600 via mobile access (S205).

On the other hand, the piece of the user data transferred to the fixed access slave station apparatus 500 is subjected to packet conversion in the fixed access slave station apparatus 500, based on the described contents in the mobile fixed conversion information DB 592 (S204). Subsequently, the piece of the user data is transferred to the mobile fixed user gateway 600 via fixed access (S206).

The pieces of the user data transferred from the two communication paths are combined in the PDCP layer processing unit 643 of the mobile fixed user gateway 600 (S207).

Gist of Invention

The base station master station apparatus 300 can connect with a plurality of mobile access slave station apparatuses 400 by performing the secondary slave station addition request, based on the cell information from the user gateway 600 ([3GPP] Secondary Node Addition Request Acknowledge). The present invention utilizes this function. The non-mobile access slave station apparatus 500 does not have a cell, and is thus provided with a pseudo cell in advance. Further, with the non-mobile access slave station apparatus 500 notifying the user gateway 600 of its own pseudo cell, from the point of view of the user gateway 600, it appears as if the number of mobile access slave station apparatuses 400 is increased by one. Thus, the user gateway 600 notifies the base station master station apparatus 300 of the cell information including the pseudo cell. At the same time, from the point of view of the base station master station apparatus 300 as well, due to the cell information including the pseudo cell, the non-mobile access slave station apparatus 500 with the pseudo cell appears to be one mobile access slave station apparatus. Further, the base station master station apparatus 300 performs the secondary slave station addition request for the non-mobile access slave station apparatus 500 and performing processing for the request, and thus a split bearer is constructed.

According to the present invention, by providing the pseudo cell for the non-mobile access slave station apparatus, the mobile access and the non-mobile access can be merged and properly used without newly applying any modifications to the function of the mobile network.

REFERENCE SIGNS LIST

100: Communication system
110: Communication system
200: Mobile core
300: Base station master station apparatus
400: Mobile access slave station apparatus
500: Fixed access (non-mobile access) slave station apparatus
510: Master station-side IF
520: Master station-side C-Plane
530: Master station-side U-Plane
540: Packet conversion unit
550: Terminal-side C-Plane
560: Terminal-side U-Plane
570: Terminal-side IF
580: Pseudo cell information control unit
591: Pseudo cell information database
592: Mobile fixed conversion information database
600: User gateway
610: Mobile radio access IF
620: Fixed access IF
630: Mobile-side C-Plane
640: Integrated U-Plane
650: Fixed-side C-Plane
661: Cell information database
662: Terminal information database
701: Base station-mobile core interface
702: Terminal-mobile core interface
703: Mobile front haul interface

The invention claimed is:

1. A communication system comprising:
a base station master station apparatus;
one or a plurality of mobile access slave station apparatuses;
one or a plurality of non-mobile access slave station apparatuses; and
a user gateway,
wherein the base station master station apparatus and one of the one or the plurality of mobile access slave station apparatuses and the base station master station apparatus and one of the one or the plurality of non-mobile access slave station apparatuses are connected with an identical front haul logic interface,
one of the one or the plurality of mobile access slave station apparatuses and the user gateway are connected with any mobile radio access,
one of the one or the plurality of non-mobile access slave station apparatuses and the user gateway are connected with any non-mobile access, and
a communication path of one mobile bearer between the base station master station apparatus and the user gateway includes a split bearer configuration including a mobile access communication path being connected from the base station master station apparatus to the user gateway via one of the one or the plurality of mobile access slave station apparatuses and a non-mobile access communication path being connected from the base station master station apparatus to the user gateway via one of the one or the plurality of non-mobile access slave station apparatuses.

2. A communication apparatus of a communication system,
the communication apparatus being a non-mobile access slave station apparatus,
the communication system including a communication path of one mobile bearer between a base station master station apparatus included in the communication system and a user gateway included in the communication system includes a split bearer configuration including a mobile access communication path being connected from the base station master station apparatus to the user gateway via a mobile access slave station apparatus included in the communication system and a non-mobile access communication path being connected from the base station master station apparatus to the user gateway via the non-mobile access slave station apparatus, the communication apparatus comprising:
 a communication path formation unit configured to form the non-mobile access communication path by connecting to the base station master station apparatus by using a front haul logic interface identical to a front haul logic interface of the mobile access slave station apparatus to be connected to the base station master station apparatus and connecting to the user gateway with any non-mobile access; and
 a conversion unit configured to perform conversion of a packet format between the non-mobile access and the front haul logic interface.

3. The communication apparatus according to claim 2 being a non-mobile access slave station apparatus, wherein the communication path formation unit includes:
 a non-mobile access connection function including an access state information control function of generating pseudo cell information and transmitting the pseudo cell information to the user gateway, and a conversion information registration function of receiving mobile terminal information from the user gateway and recording the mobile terminal information and non-mobile access terminal information in a conversion information database in association with each other; and
 a mobile front haul connection function including a conversion information update function of registering the mobile terminal information received from the base station master station apparatus with a mobile fixed conversion information database when slave station addition processing for a mobile terminal is executed in response to a request from the base station master station apparatus, and the conversion unit includes
 a packet conversion function of converting a header of a user data packet transferred from the front haul logic interface for the user data packet, based on a record of the mobile fixed conversion information database.

4. A terminal apparatus of a communication system,
the terminal apparatus being a user gateway,
in the communication system, a base station master station apparatus of the communication system and a mobile access slave station apparatus of the communication system, and the base station master station apparatus and a non-mobile access slave station apparatus of the communication system being connected with an identical front haul logic interface, the terminal apparatus comprising:
 a mobile access interface to be connected to the mobile access slave station apparatus with mobile access;
 a non-mobile access interface to be connected to the non-mobile access slave station apparatus with non-mobile access;
 a mobile terminal information transmission function of transmitting mobile terminal information to the non-mobile access slave station apparatus; and
 a pseudo cell state information reception function of receiving pseudo cell information transmitted from the non-mobile access and registering the pseudo cell information with a cell information database, wherein a communication path of one mobile bearer with the base station master station apparatus configures a split bearer including a mobile access communication path being connected from the base station master station apparatus via the mobile access slave station apparatus and a non-mobile access communication path being connected from the base station master station apparatus via the non-mobile access slave station apparatus.

* * * * *